US007866444B2

(12) United States Patent
Aldridge

(10) Patent No.: US 7,866,444 B2
(45) Date of Patent: Jan. 11, 2011

(54) CASCADING OIL FLOW BEARING LUBRICATION DEVICE

(75) Inventor: John Aldridge, Lafayette, IN (US)

(73) Assignee: Fairfield Manufacturing Company, Inc., Lafayette, IN (US)

( * ) Notice: Subject to any disclaimer, the term of this patent is extended or adjusted under 35 U.S.C. 154(b) by 1264 days.

(21) Appl. No.: 11/399,123

(22) Filed: Apr. 6, 2006

(65) Prior Publication Data

US 2007/0295557 A1    Dec. 27, 2007

(51) Int. Cl.
F16N 7/26        (2006.01)
F16N 7/28        (2006.01)
F16N 7/36        (2006.01)
(52) U.S. Cl. ............... 184/6.18; 184/11.1; 184/11.2; 184/13.1
(58) Field of Classification Search ............. 184/11.1, 184/11.2, 13.1; 74/467, 468; 475/159, 160
See application file for complete search history.

(56) References Cited

U.S. PATENT DOCUMENTS

| 1,570,356 | A | 1/1926 | Lane |
| 3,767,013 | A | 10/1973 | Caldwell |
| 4,018,097 | A | 4/1977 | Ross |
| 4,031,780 | A | 6/1977 | Dolan et al. |
| 4,050,544 | A | 9/1977 | Kalyan et al. |
| 4,051,922 | A | 10/1977 | Sukle |
| 4,057,126 | A | 11/1977 | Stephens |
| 4,090,588 | A | 5/1978 | Willover |
| 4,121,694 | A | 10/1978 | Nelson |
| 4,170,549 | A | 10/1979 | Johnson |
| 4,221,279 | A | 9/1980 | Jones et al. |
| 4,222,283 | A | 9/1980 | Nagy |
| 4,327,950 | A | 5/1982 | Czuszak |
| 4,359,142 | A | 11/1982 | Schultz et al. |
| 4,361,774 | A | 11/1982 | Czech |
| 4,448,552 | A | 5/1984 | White et al. |

(Continued)

FOREIGN PATENT DOCUMENTS

JP        60157593 A    12/2008

OTHER PUBLICATIONS

U.S. Appl. No. 11/690,785, Schoon.

(Continued)

Primary Examiner—Michael R Mansen
Assistant Examiner—Robert T Reese
(74) Attorney, Agent, or Firm—Woodling, Krost and Rust

(57) ABSTRACT

A bearing lubrication system includes a stationary output shaft carrier housed within a gear housing wherein the output shaft resides partially within the carrier and upper and lower bearings support the shaft. The carrier includes first and second arcuately extending troughs for catching lubricating fluid slung by an oil slinger. The first trough is in fluid communication with the shaft and with the upper bearing which pumps fluid through the bearing and into an upper passageway which terminates in an opening which supplies fluid to a second trough which, in turn, supplies fluid to the second bearing which, in turn, supplies fluid to the annular pool formed on the upper portion of the gear affixed to the output shaft. The annular pool is formed by a cylindrically shaped dike secured to the upper portion of the gear. Overflow from the pool lubricates the gear and returns oil to the reservoir.

29 Claims, 13 Drawing Sheets

U.S. PATENT DOCUMENTS

| | | | |
|---|---|---|---|
| 4,545,332 A | 10/1985 | Suzuki et al. |
| 4,588,385 A | 5/1986 | Suzuki et al. |
| 4,616,736 A | 10/1986 | Fox |
| 4,683,771 A | 8/1987 | Sogo et al. |
| 4,683,985 A | 8/1987 | Hultgren |
| 4,700,808 A | 10/1987 | Haentjens |
| 4,705,449 A | 11/1987 | Christianson et al. |
| 4,741,303 A | 5/1988 | Kronich |
| 4,762,471 A | 8/1988 | Asanuma et al. |
| 4,766,859 A | 8/1988 | Miyaki et al. |
| 4,952,077 A | 8/1990 | Kurt |
| 4,987,974 A | 1/1991 | Crouch |
| 5,024,636 A | 6/1991 | Phebus et al. |
| 5,064,025 A * | 11/1991 | Richards ............... 184/6.12 |
| 5,161,644 A | 11/1992 | Swenskowski et al. |
| 5,333,704 A | 8/1994 | Hoff |
| 5,340,273 A | 8/1994 | Rockwood |
| 5,453,181 A | 9/1995 | Dahlback et al. |
| 5,478,290 A | 12/1995 | Buuck et al. |
| 5,480,003 A | 1/1996 | Hill et al. |
| 5,489,013 A | 2/1996 | Buuck et al. |
| 5,505,112 A | 4/1996 | Gee |
| 5,558,180 A | 9/1996 | Yanagisawa |
| 5,591,018 A | 1/1997 | Takeuchi et al. |
| 5,601,155 A | 2/1997 | Gardner |
| 5,616,097 A | 4/1997 | Dammon |
| 5,630,481 A | 5/1997 | Rivard |
| 5,634,530 A | 6/1997 | Maekawa et al. |
| 5,662,188 A | 9/1997 | Ito et al. |
| 5,667,036 A | 9/1997 | Mueller et al. |
| 5,699,877 A | 12/1997 | Dreier |
| 5,725,072 A | 3/1998 | Yamamoto et al. |
| 5,768,954 A | 6/1998 | Grabherr et al. |
| 5,779,005 A * | 7/1998 | Jones et al. ............ 184/6.18 |
| 5,810,116 A | 9/1998 | Kaptrosky |
| 5,860,403 A | 1/1999 | Hirano et al. |
| 5,887,678 A | 3/1999 | Lavender |
| 5,947,075 A | 9/1999 | Ryu et al. |
| 6,106,254 A | 8/2000 | Hirooka et al. |
| 6,139,295 A | 10/2000 | Utter et al. |
| 6,146,118 A | 11/2000 | Haller et al. |
| 6,213,078 B1 | 4/2001 | Ryu et al. |
| 6,213,081 B1 | 4/2001 | Ryu et al. |
| 6,223,858 B1 | 5/2001 | Ubagai et al. |
| 6,244,386 B1 | 6/2001 | Takasaki et al. |
| 6,327,994 B1 | 12/2001 | Labrador |
| 6,374,951 B1 | 4/2002 | Michelhaugh |
| 6,394,061 B2 | 5/2002 | Ryu et al. |
| 6,439,208 B1 | 8/2002 | Jones |
| 6,516,789 B1 | 2/2003 | Jones |
| 6,616,432 B2 | 9/2003 | Sczcepanski et al. |
| 6,698,762 B2 | 3/2004 | Newberg et al. |
| 6,705,555 B1 | 3/2004 | Bratten |
| 6,810,849 B1 | 11/2004 | Hirsch et al. |
| 6,852,061 B2 | 2/2005 | Schoon |
| 6,863,043 B2 | 3/2005 | Kurihara et al. |
| 6,880,223 B2 * | 4/2005 | Bednar ............... 29/434 |
| 6,964,313 B2 | 11/2005 | Phillips, III et al. |
| 2003/0032516 A1 | 2/2003 | Gervais, III |
| 2003/0037737 A1 | 2/2003 | Artola |
| 2004/0087405 A1 | 5/2004 | Inoue et al. |
| 2004/0235606 A1 | 11/2004 | Brossard |
| 2005/0032602 A1 | 2/2005 | Wagle et al. |
| 2005/0176545 A1 | 8/2005 | Miller et al. |
| 2005/0178893 A1 | 8/2005 | Miller et al. |
| 2005/0272551 A1 | 12/2005 | Oates |

OTHER PUBLICATIONS

U.S. Appl. No. 11/948,657, Schoon.
European Search Report, EP 1 843 056 A3, Application No. EP 06 01 9821, Dec. 12, 2008, Munich.
Imperial Electric Offset Gearbox Frame 56, Copyright 2004.

* cited by examiner

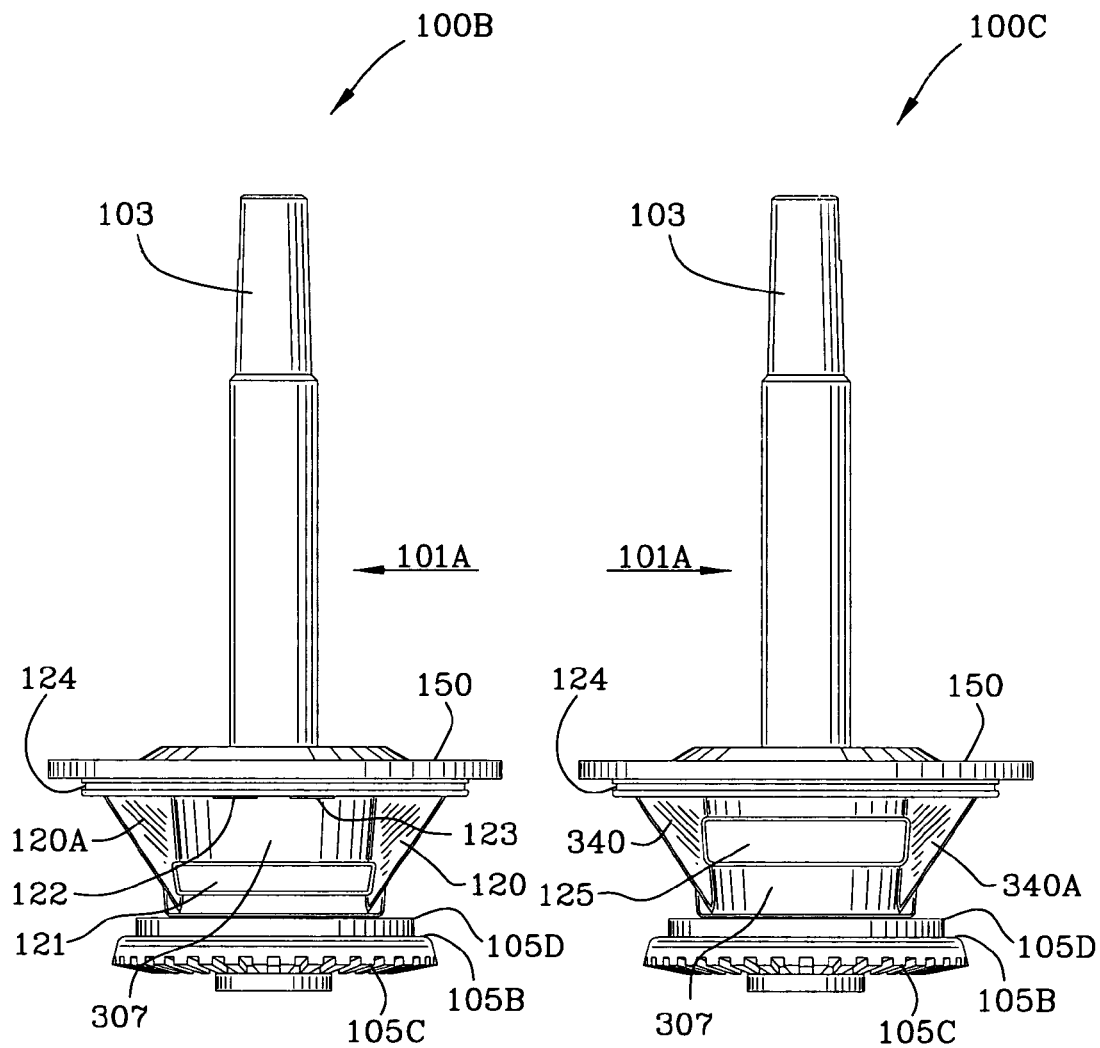

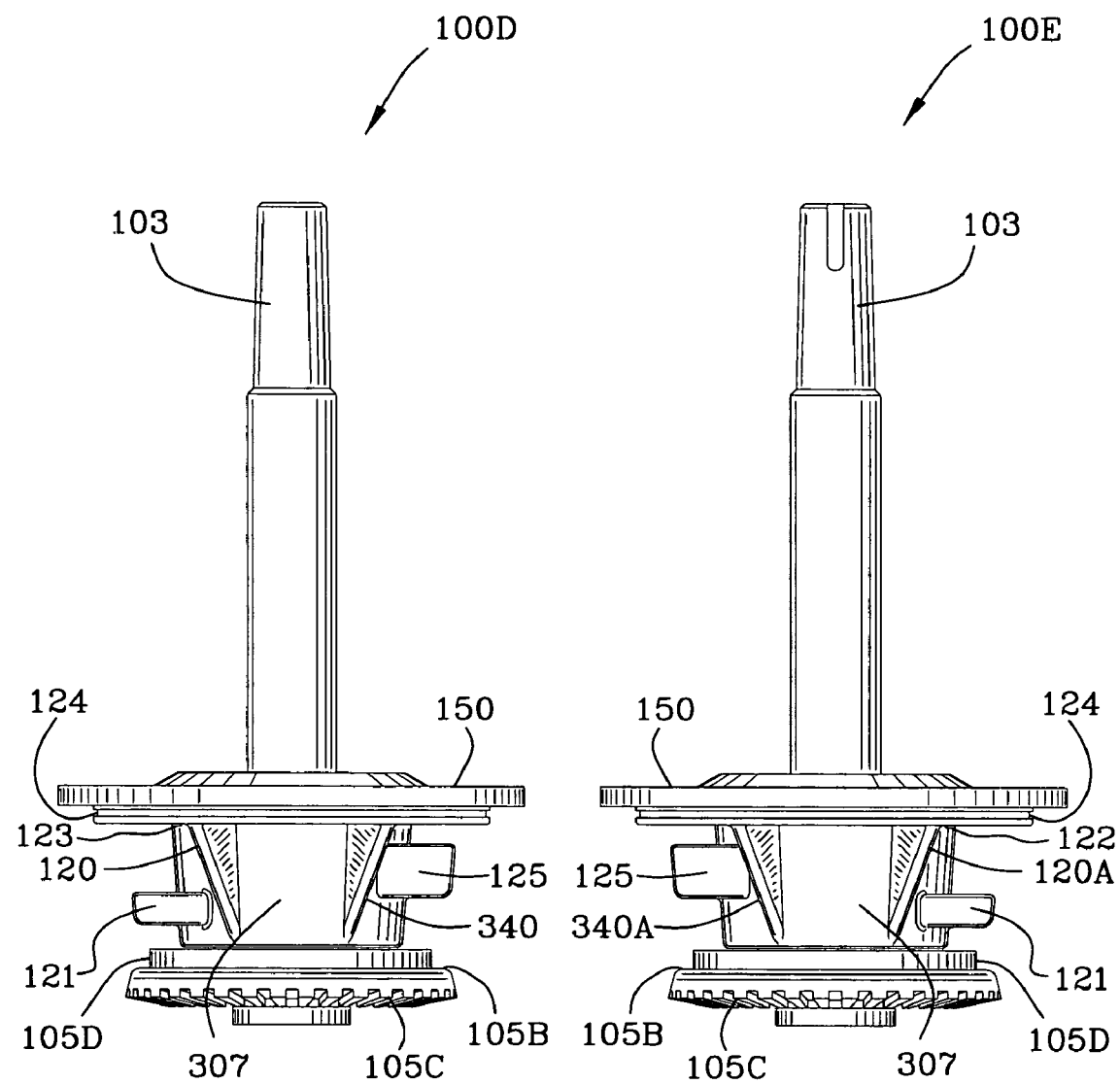

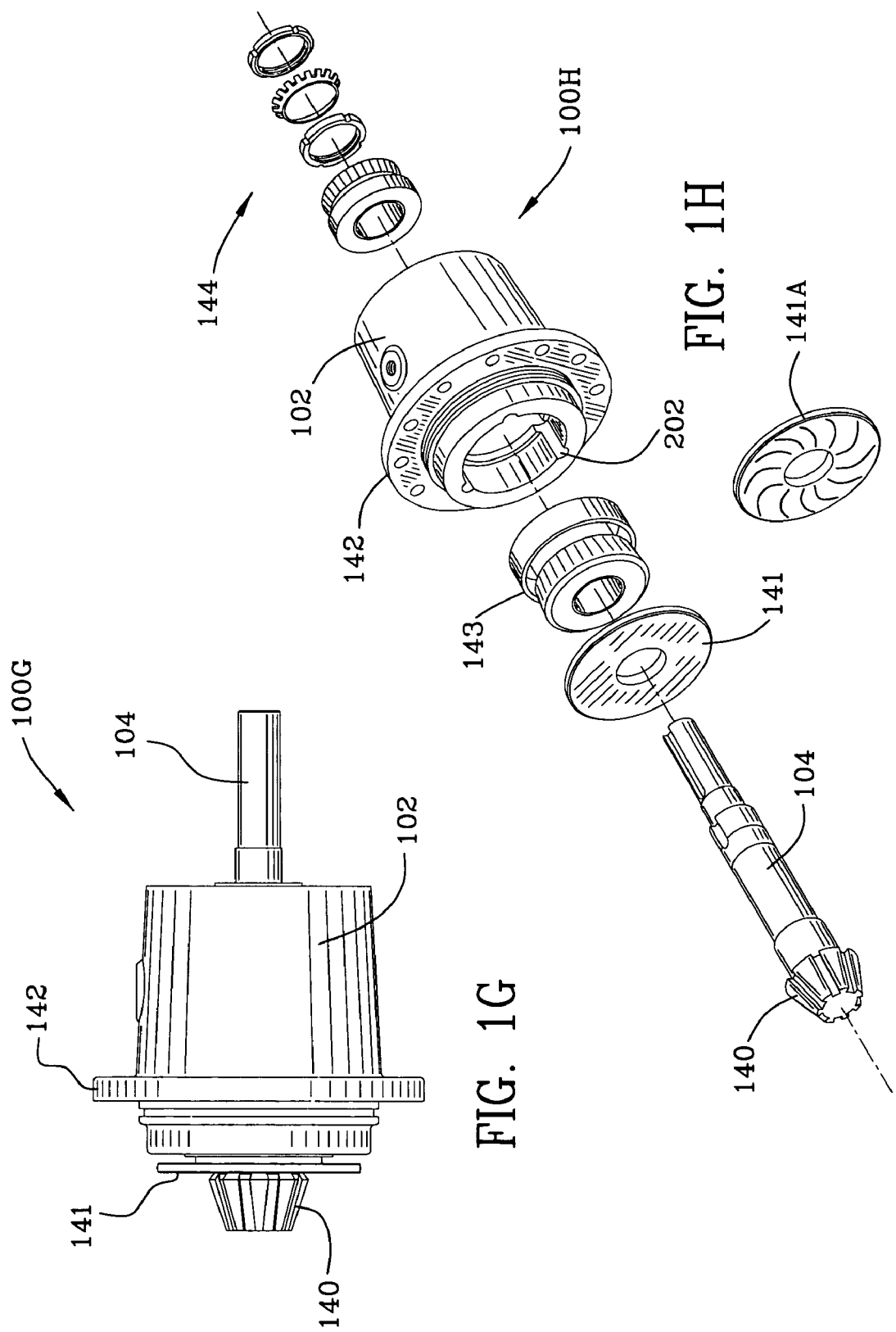

CASCADING OIL FLOW BEARING LUBRICATION DEVICE

FIELD OF THE INVENTION

This invention is in the field of cascading oil flow bearing lubrication devices.

BACKGROUND OF THE INVENTION

U.S. Pat. No. 4,952,077 to Kurt indicates that spray oil is collected in an oil-catcher device 20 arranged above the pinion gear. The oil catcher 20 is fastened on an annular plate 21 which, with an annular gasket interposed, is fastened to the bearing plate 6. The oil catcher extends over the entire depth of the gearbox 15 and has a cross-section in the form of an upturned V and is equipped with a plate 23 having holes in the top thereof. The quantity of the oil collected can be controlled by the number and size of the holes. A pipeline leads from the bottom of the oil-catcher device 20 to an annular oil chamber 26. Kurt goes on to explain that the oil collected in the annular chamber 26 passes through the overflow bores 29 into an intermediate space 30 where it is atomized to form an oil mist by a swirl edge on the rotating bearing retaining ring. Excess oil flows into an oil retention device 32 where enough oil is stored to ensure lubrication after a shut down for a prolonged period of time. See, col. 3, line 34 of the '077 Kurt patent.

Kurt is clearly collecting oil in a trough and it then intentionally runs through overflow bores into an intermediate space and clearly there is some structure that allows for cold start-up of rail vehicles.

U.S. Pat. No. 5,161,644 to Swenskowski et al. is designed to serve forward bearings in a transmission when the vehicle is going up an incline (hill). Gearing within the casing distributes oil from the reservoir 28 to a second reservoir 32 where additional gearing deposits oil into first trough 38 which in turn feeds second trough 40. If fluid is present in reservoir 36 it may be deposited into trough 40 which is open on the side as illustrated in the other patent drawings.

U.S. Pat. No. 5,630,481 to Rivard illustrates a radial sleeve bearing and associated lubrication system used on steam turbines. Oil ring 54 rotates non-concentrically with shaft 22 and transfers oil to trough 58 as illustrated in FIGS. 2 and 3 of the '481 patent. Additionally, side scuppers 68 collect oil which is then communicated to the bearing 30 through a series of passageways.

U.S. Pat. No. 4,545,332, to Suzuki et al. discloses an engine having troughs 113, 114 etc. spaced in proximity to a cam rod for lubrication of lifters and other parts of the engine. See, FIG. 3 of the '332 patent to Suzuki et al.

United States Patent Application Publication No. US2005/0272551 A1 to Oates discloses a method and apparatus for lubricating a differential gear assembly. FIG. 3 of the US 2005/0272551 application illustrates a housing having a casting 90 which forms trough 96. Bearings 88 supply oil (pump) to the seal fluid cavity 94 which then passes through channel 86 to lubricate the inter-axle differential gear assembly.

None of the references disclose individually or in combination an output shaft carrier affixed to a gear which includes troughs, passageways to and from the troughs, and bearings which pump the lubricating fluid in a cascading relationship.

SUMMARY OF THE INVENTION

A bearing lubrication device which includes an output shaft carrier housed within a gear housing is disclosed and claimed. The output shaft resides partially within the output shaft carrier and upper and lower bearings support the output shaft. The output shaft carrier includes a first trough for catching lubricating fluid which is slung by an oil slinger. The first trough is in lubricating fluid communication with the upper bearing which pumps the lubricating fluid through the bearing and into an upper passageway which terminates in an opening from which the lubricating fluid emanates. The output shaft carrier includes a second trough in fluid communication with the opening of the upper passageway wherein fluid spills from the upper passageway into the lower trough. More troughs may be used in other designs to facilitate lubrication.

The lower bearing supports the shaft and is in communication with the second trough. The output shaft includes a gear affixed thereto which has a flat upper portion with a cylindrically shaped dike secured therein which forms an annular pool fed by the lower bearing which supplies (pumps) lubricating fluid to said annular pool. Overflow from the pool lubricates the gear and returns oil to the reservoir. When the gear is rotating the overflow of fluid from the pool will be enhanced due to centrifugal force applied to the fluid.

The output shaft carrier includes a body portion and a top (flange) portion. The top portion includes a flange and a lip for securement to and sealing with the housing. The body portion is generally cylindrically shaped. The generally cylindrically shaped body portion may be slightly tapered.

The first trough extends arcuately from the body portion of the output carrier shaft and supplies oil through first and second passageways to the shaft and to the upper bearing. As the oil (lubricant) leaves the upper bearing it proceeds into and through third and fourth passageways from which the oil (lubricant) emanates and drops down into the second trough which is lower than the first trough. The second trough extends arcuately from the body portion of the output carrier shaft and resides on the opposite side of the body from the first trough.

The second trough is not as deep as the first trough and is interconnected to the interior of the output shaft carrier and the lower bearing by fifth and sixth passageways.

A process for lubricating an output shaft with the output shaft being carried partially within an output shaft carrier is disclosed and claimed. The output shaft carrier has a body, an interior and an exterior. The process includes the steps of slinging lubricant into a first trough of the output shaft carrier; supplying lubricant from the first trough of the output shaft carrier through a first passageway in the body of the output shaft carrier to the interior of the body lubricating the shaft; pumping lubricant through an upper bearing to and through a second passageway; spilling lubricant from said second passageway; catching lubricant in a second trough; and, pumping lubricant through a lower bearing to a pool. Further process steps include overflowing the pool to lubricate the gear and to return the lubricant to the reservoir.

It is an object of the invention to provide an output carrier shaft to lubricate the bearings of an output shaft.

It is an object of the invention to provide an output carrier shaft having first and second troughs for receiving lubricant. It is a further object of the invention to provide passageways through the body of the output shaft carrier to enable communication of fluid therebetween.

It is an object of the invention to provide an output carrier shaft which encases bearings therein which pump lubricating fluid.

It is an object of the invention to provide cold start-up lubrication of bearings.

It is a further object of the invention to provide first and second troughs which are arcuately shaped and extend radially outwardly from the exterior of the output shaft carrier.

These and other objects will be best understood when reference is made to the Brief Description of the Drawings, Description of the Invention and Claims which follow hereinbelow.

BRIEF DESCRIPTION OF THE DRAWINGS

FIG. 1B is a left side view of the output carrier shaft and gear affixed thereto.

FIG. 1C is a right side view of the output carrier shaft and gear affixed thereto.

FIG. 1D is a front side view of the output carrier shaft and gear affixed thereto.

FIG. 1E is a rear side view of the output carrier shaft and gear affixed thereto.

FIG. 1G is a front side view of the input housing, gear and oil slinger.

FIG. 1H is an exploded view of FIG. 1G.

The drawings will be better understood when reference is made to the Description of the Invention and Claims which follow hereinbelow.

DESCRIPTION OF THE INVENTION

Figure 1:
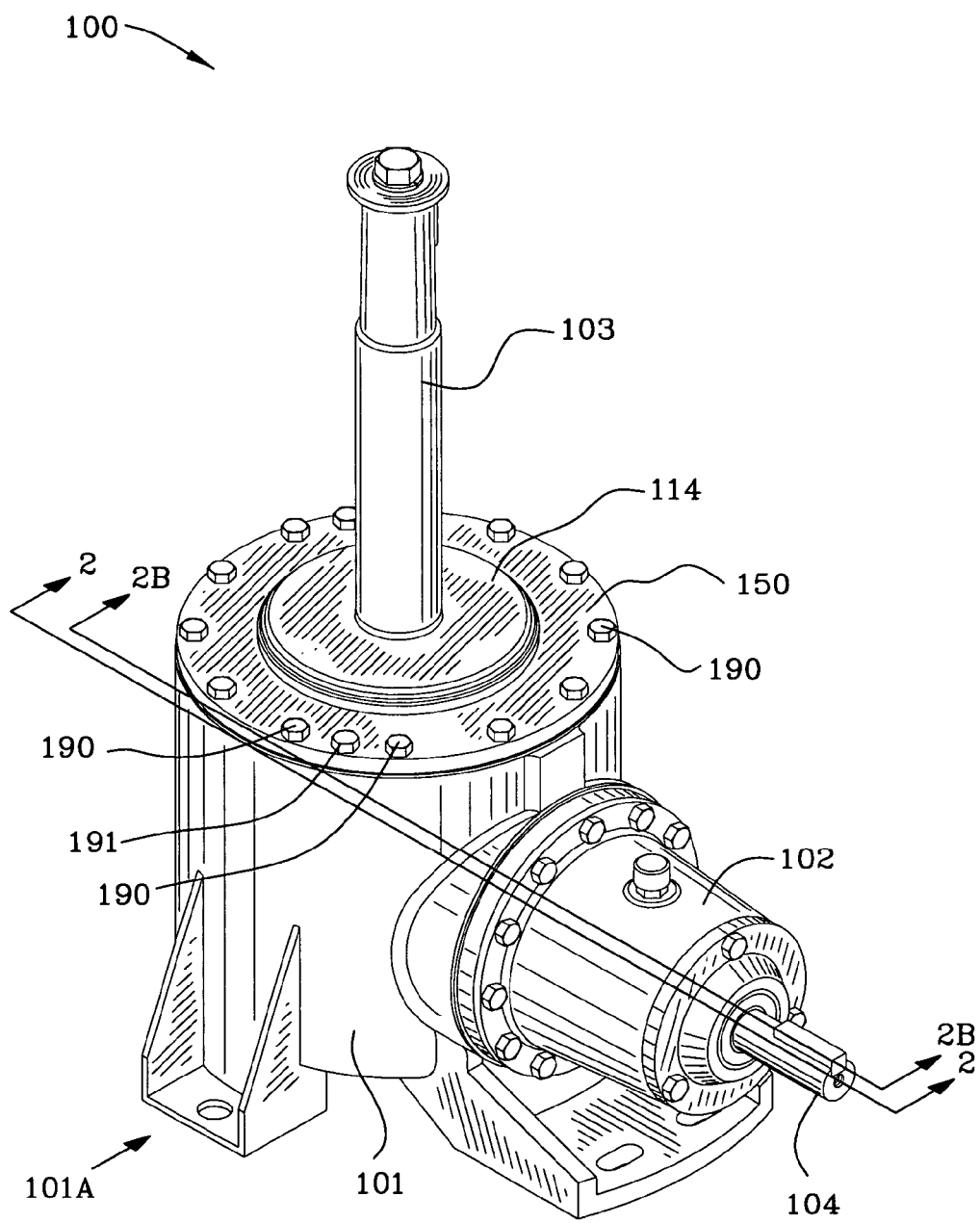
FIG. 1 is a perspective view of the assembled gear reducer.

FIG. 1 is a perspective view of the assembled gear reducer 100. The gear reducer may be manufactured in various sizes and using various materials. Reference numeral 101A indicates the front side of the gear reducer and the drawings and the device will be described herein with the front side being referenced as herein defined. Output shaft 103 is a vertical shaft and input shaft 104 is, as illustrated, a horizontal shaft. Output shaft carrier 150 is illustrated as being affixed to housing 101 by threaded connectors or studs 190, 191. It will be noticed that threaded connector or stud 191 is illustrated intermediate adjacent connectors 190. Threaded connector or stud 191 is used to correctly orient the affixation of the output shaft carrier 150 and its troughs with respect to the housing 101. Input shaft housing 102 is illustrated affixed to housing 101. Water slinger 114 caps the output carrier shaft 150 and is held in place by lip seal 112. Lip seal 112 is best viewed in FIGS. 2A and 2B.

Figure 1A:
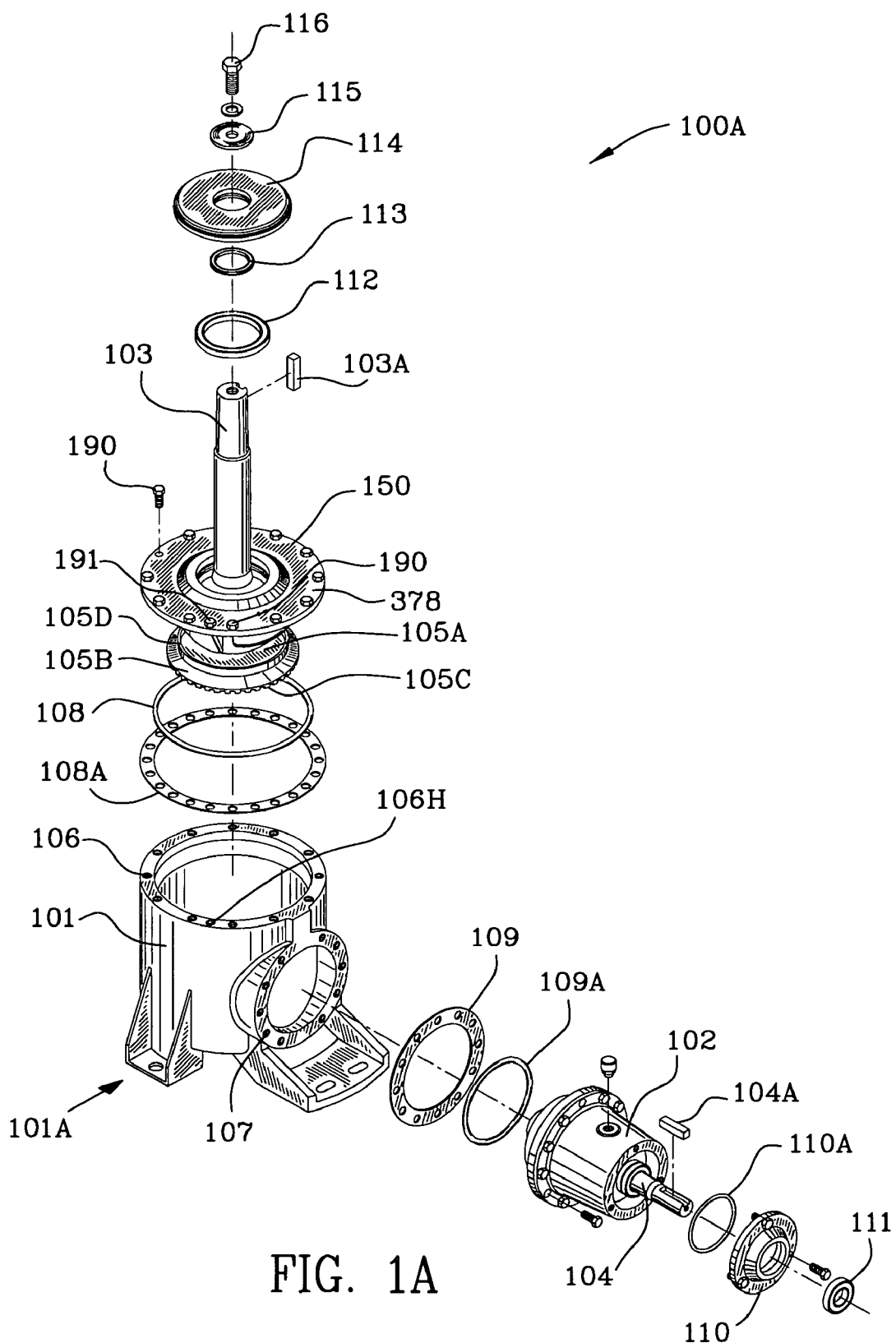
FIG. 1A is an exploded perspective view of the gear reducer illustrated in FIG. 1.

FIG. 1A is an exploded perspective view 100A of the gear reducer illustrated in FIG. 1. Output shaft carrier 150 illustrates connectors 190, 191 diagrammatically so as to orient the carrier 150 with respect to the housing 101. Connector 191 interengages mating receptacle 106H and the plurality of connectors 190 interengage mating receptacles 106. Gear 105C is illustrated affixed to output shaft 103. Gear 105C includes a flat upper portion 105A and a dike 105D which resides in an annular groove 105E in the upper portion of the gear. A crowned portion 105B of gear 105C is also illustrated in FIGS. 1B-1E.

Figure 2:
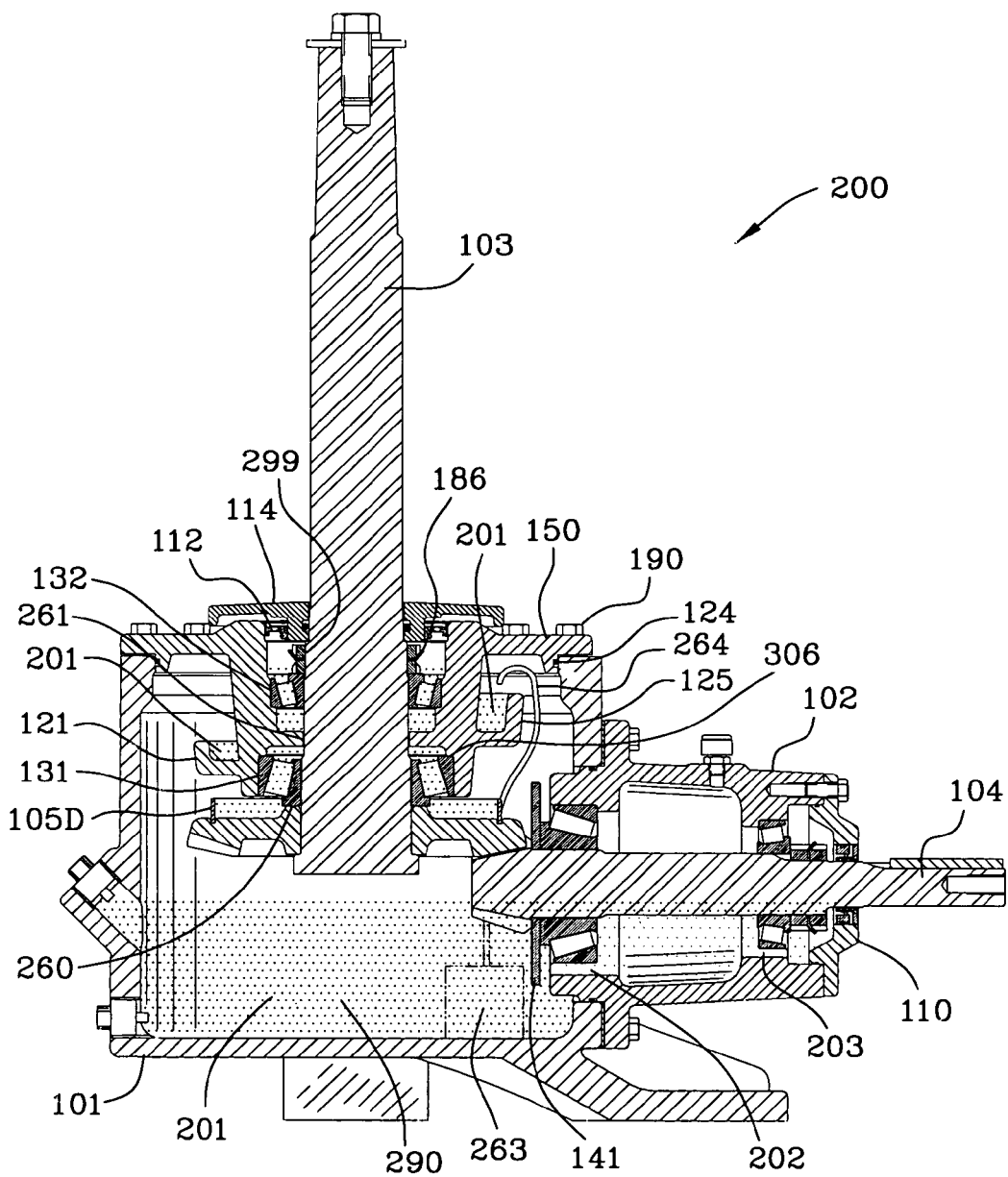
FIG. 2 is a cross-sectional view of the gear reducer of FIG. 1 taken along the lines 2-2.
Figure 2A:
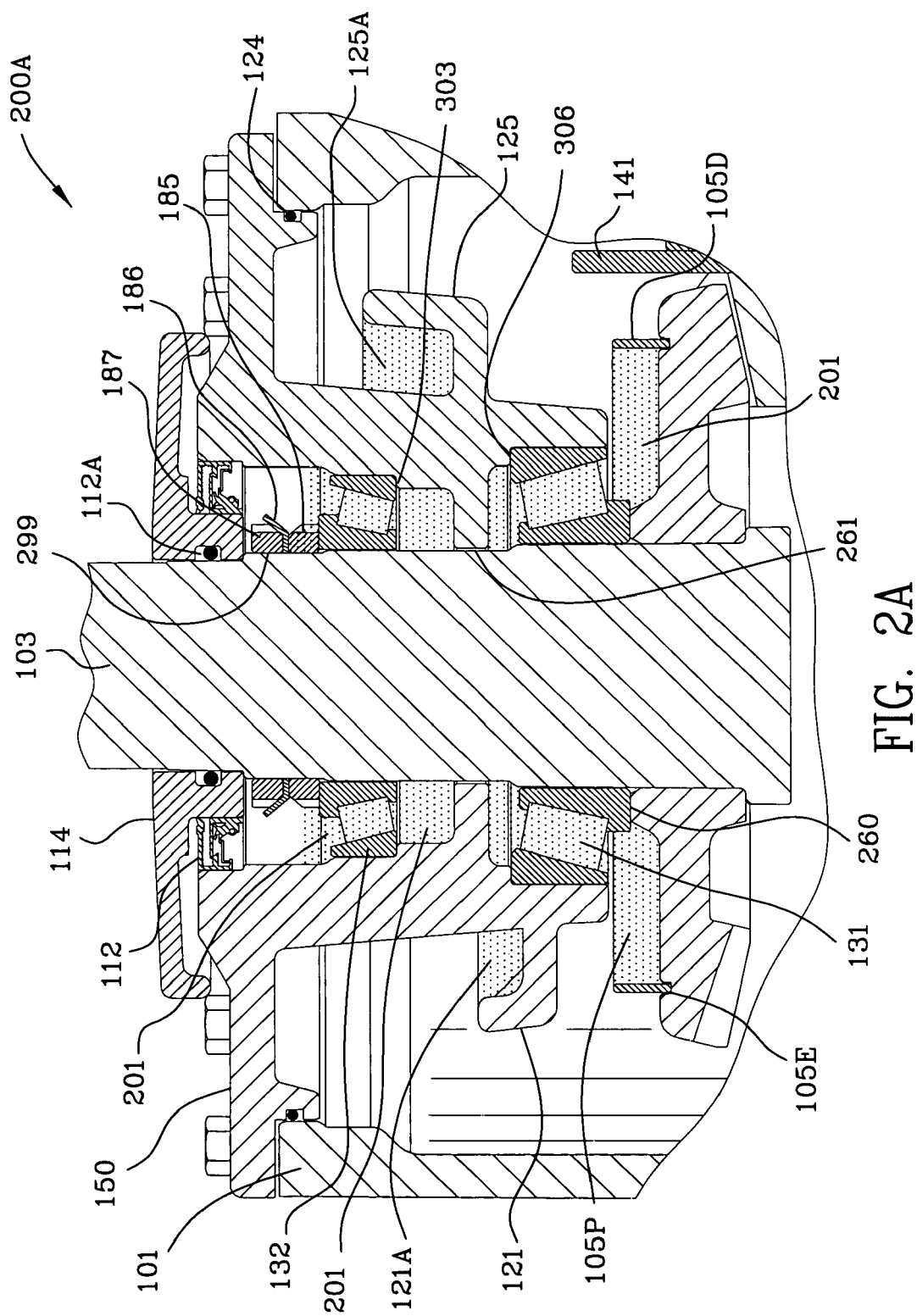
FIG. 2A is an enlargement of a portion of FIG. 2 illustrating the output shaft carrier, bearings and troughs in greater detail.
Figure 2B:
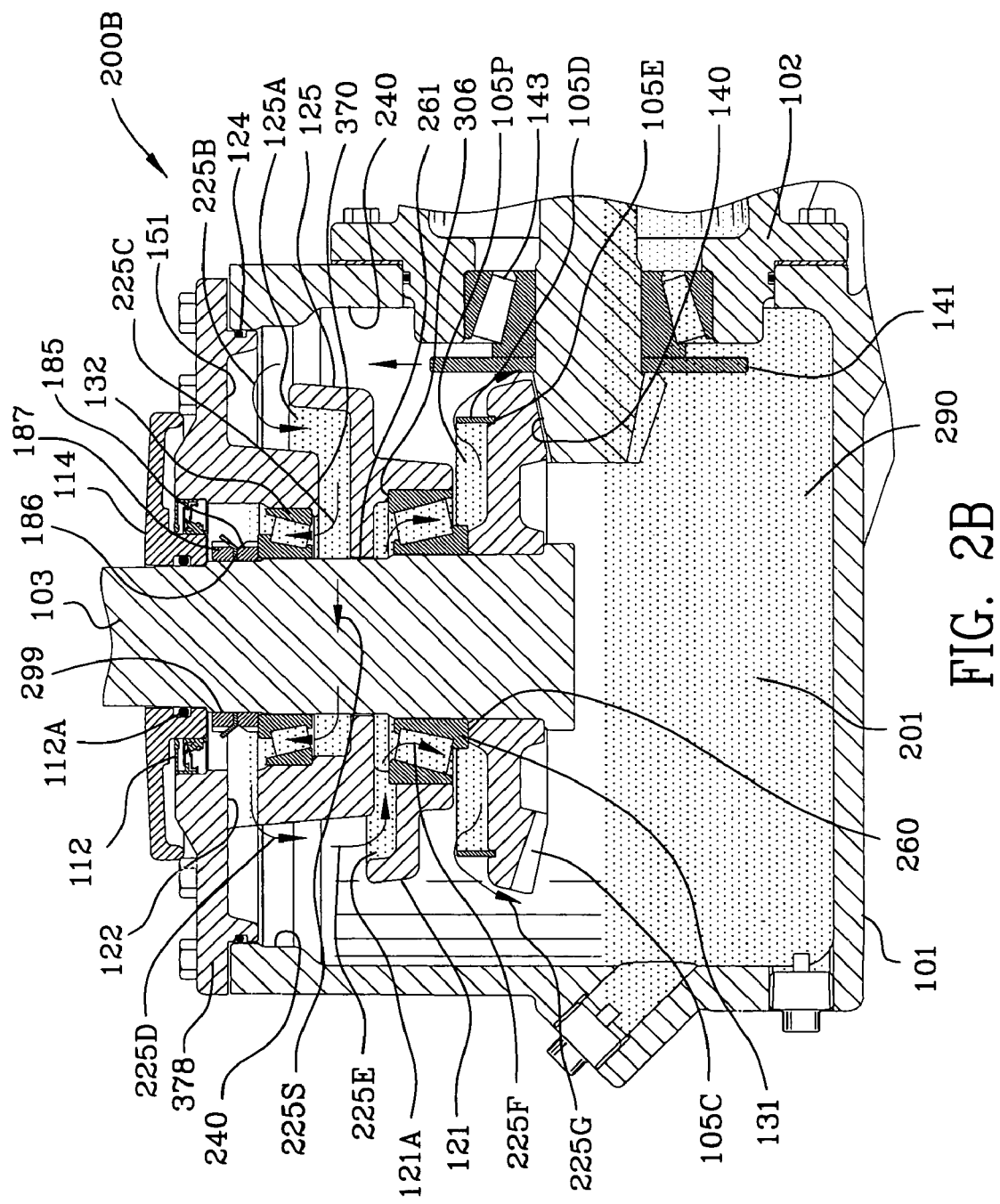
FIG. 2B is an enlargement of the gear housing, output shaft carrier and the troughs taken along the line 2B-2B of FIG. 1.

Still referring to FIG. 1A, lip seal 112 interfits with water slinger 114 to hold the water slinger 114 in place as best illustrated in FIGS. 2, 2A and 2B. Washer 115, screw 116 and key 103A are illustrated for the sake of completeness in regard to connecting a load (driven device) to the output shaft 103.

O-ring seal 108 and shim pack 108A seal the flange portion 378 of output shaft carrier 150 to the housing 101. See FIGS. 3F and 3G for a clear illustration of flange portion 378 of output shaft carrier 150. Input housing 102 is secured to housing flange 107 by connectors as illustrated in FIG. 1A with O-ring 109A and shim pack 109 interposed therebetween. O-ring 110A and seal 111 are secured to the input housing by shaft seal 110.

FIG. 1B is a left side view 100B of the output carrier shaft 150 and gear 105C affixed thereto. Lip 124 carries a seal (not shown) and is inserted into housing 101 as best illustrated in FIGS. 2, 2A and 2B. Second lubricant catching trough 121 is illustrated in FIG. 1B extending arcuately between supports 120A and 120. Trough 121 extends radially outwardly from body portion 307 and is open on the top thereof for the collection of oil (lubricating fluid). A portion of third and fourth passageways 122 and 123 which extend through the body of the output shaft carrier 150 can be seen. Third and fourth passageways 122 and 123 are bearing lubricant passageways which permit lubricant flow from the interior to the exterior of the body of the output shaft carrier. Specifically, passageways 122 and 123 terminate in openings from which lubricating fluid (i.e., lubricating oil) emanates where it then falls under the influence of gravity to second trough 122.

The terms "oil", "lubricating fluid" and "lubrication fluid" are used interchangeably herein. All types of lubricants including synthetic lubricants may be used.

Output shaft carrier 150 is preferably cast steel but may be made from a variety of materials such as plastic. Output shaft carrier 150 includes a generally cylindrically shaped exterior portion. However, different exterior geometrical shapes may be employed for the output shaft carrier. The output shaft carrier is preferably made as a casting, however, it is contemplated that it may be manufactured as a machined part.

Dike 105D is illustrated in FIGS. 1B-1D and stores lubricating fluid in a pool which rotates with gear 105C. As gear 105C rotates lubricating oil overflows dike 105D and is then directed toward gear surface 105B where it is slung radially outwardly and is intercepted, at least in part, by oil slinger 141. Oil slinger 141 is submerged approximately half way into reservoir 290. See, FIGS. 2, 2A and 2B. Most of the lubricating fluid, however, is returned to the lubricating fluid reservoir 290 which is also illustrated in FIGS. 2, 2A and 2B.

FIG. 1C is a right side view 100C of the output carrier shaft 150 and gear 105C affixed thereto. First lubricant catching trough 125 is illustrated interposed between supports 340 and 340A and extends arcuately therefrom. Oil slinger 141 is a flat steel plate and rotates with input shaft 104 and picks up oil from reservoir 290 and expels it radially outwardly. Trough 125 is in proximity with oil slinger 141 for catching lubricating oil as will be described below and as illustrated in FIGS. 2, 2A and 2B. First trough 125 also extends radially outwardly from body 307 of the output shaft carrier. Alternatively, or additionally, a gear driven pump 263 may be used to transport oil through a tube 264 from the reservoir to the first trough 125. See FIG. 2A.

FIG. 1D is a front side view 100D of the output carrier shaft 150 and gear 105C affixed thereto illustrating first trough 125 and second trough 121. First 125 and second 121 troughs extend arcuately around the body of the output carrier shaft 150 and it can be seen from FIGS. 1D and 1E that first trough 125 is vertically higher than second trough 121. When viewing the various drawing figures it should be kept in mind that the output shaft carrier 150 is affixed to the housing 101 and does not rotate. The shaft and a portion of the bearings rotate with the shaft within the output shaft carrier. FIG. 1E is a rear side view 100E of the output carrier shaft 150 and gear 105C affixed thereto.

Figure 1F:
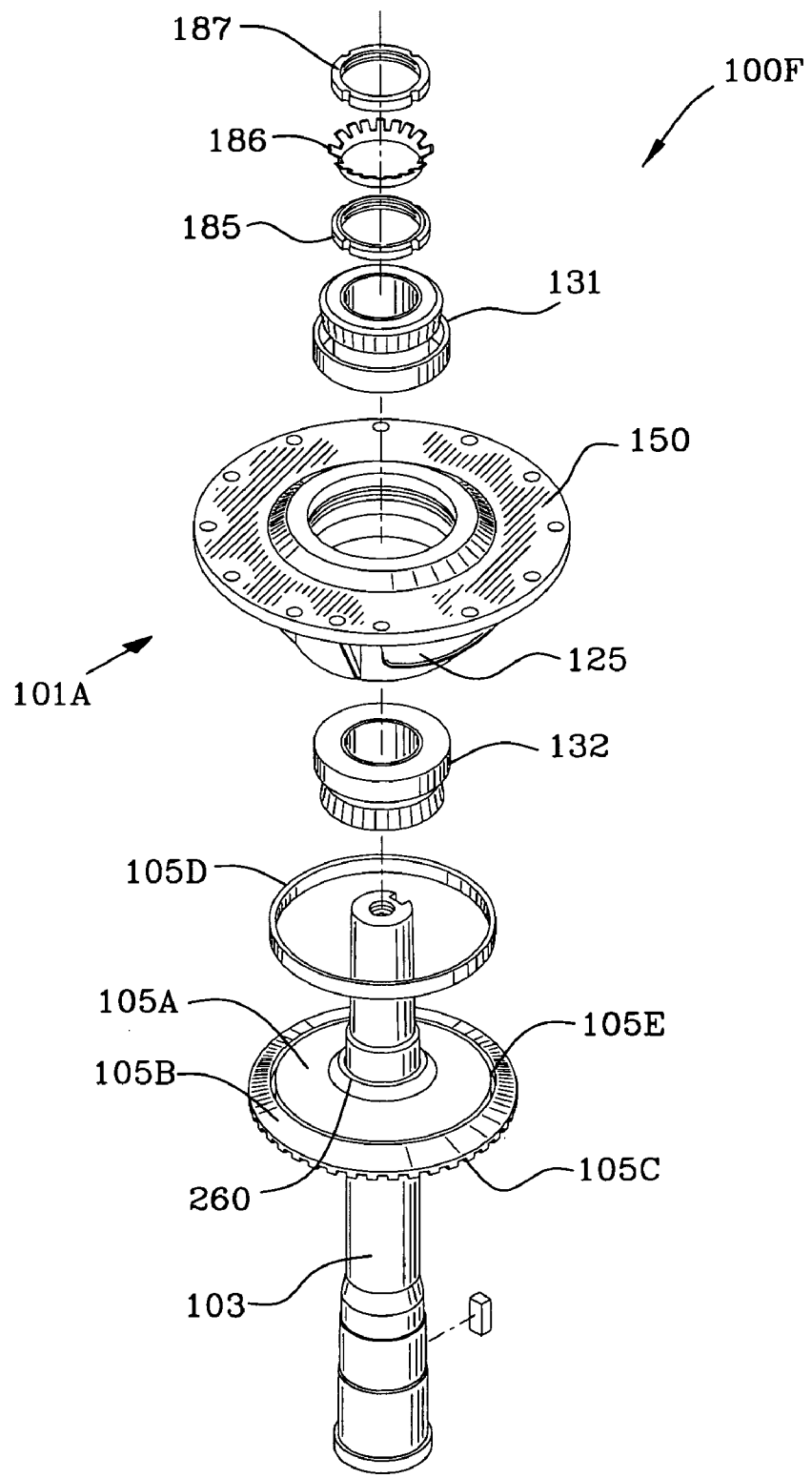
FIG. 1F is an exploded view of the output shaft carrier, output shaft and bearings.

FIG. 1F is an exploded perspective view 100F of the output shaft carrier 150, the output shaft 103 and bearings 131, 132. The bearings and their fit within the output carrier shaft 150 are best illustrated in FIGS. 2, 2A and 2B. Gear 105C includes a generally flat upper surface 105A or upper portion 105A as previously indicated above. An annular recess 105E in the upper surface 105A receives dike 105D which is press-fit within the recess 105E. Land 260 provides support for and traps the lower bearing 131 and is a raised surface on the upper portion 105A of the gear 105C. Bearing 131 is trapped between land 260 on gear 105C and lower shoulder 306 of the output shaft carrier. See, FIGS. 2A, 2B and 3B. Bearings 131, 132 are press-fit onto shaft 103. When the gear reducer is idle the oil pools in pockets around the bearings minimizing the risk of bearing damage due to "dry startup".

Still referring to FIG. 1F, bearing 132 is illustrated and as can be seen from FIGS. 2A and 2B upper bearing 132 is trapped between shoulder 303 of the output shaft carrier and lock nut 185. Lock nut 185 is threaded 299 to shaft 103. Threads 299 are indicated on the shaft 103 diagrammatically. Lock nut 185 retains the upper bearing 132 and secures the shaft from vertical movement within the output shaft carrier 150. An numbered key illustrated in FIG. 1F coacts with shaft 103 and gear 105C to secure the gear to the shaft.

FIG. 1G is a front side view 100G of the input housing 102, gear 140 and oil slinger 141. Input gear 140 coacts with driven gear 105C to communicate power to the output shaft 103. FIG. 1H is an exploded view 100H of FIG. 1G illustrating an alternative oil slinger 141A having a patterned surface with raised, spiral ridges. Oil slinger 141 is preferably a flat metal disk but can have patterned surface contours to aid in throwing the oil radially outwardly as desired by a particular application. Passageway 202 illustrated in FIG. 1H enables oil to pass between reservoir 290 and the interior of input housing 102 for lubrication of inner 143 and outer 144 bearings. Unnumbered fill ports are illustrated in housing 101 and input housing 102.

FIG. 2 is a cross-sectional view 200 of the gear reducer of FIG. 1 taken along the lines 2-2. Lubricant in the form of a fluid 201 is illustrated in the reservoir 290 and in the input shaft housing 102. Passageways 202 and 203 in the input housing 102 are illustrated in FIG. 2. Still referring to FIG. 2, first trough 125 is illustrated in cross-section and a close inspection of FIG. 2 reveals that the passageways from first trough 125 communicating with the interior of the output shaft carrier are not shown in this view. FIG. 2A is an enlargement 200A of a portion of FIG. 2 illustrating the output shaft carrier 150 secured to housing 101 and the bearings and the troughs 125, 121 in greater detail. Lubricating fluid 201 is illustrated by the dotted line pattern in FIGS. 2, 2A and 2B. Referring to FIGS. 2, 2A, and 2B, upper bearing 132 pumps oil entering it from the oil volume beneath it as illustrated by flow arrow 225C in FIG. 2B.

FIG. 2B is an enlargement 200B of the gear housing 101, output shaft carrier 150 and the troughs 125, 121 taken along the line 2B-2B of FIG. 1. Reference numeral 125A indicates a volume of oil within first trough 125 which indicates the walls of the first trough. It will be noticed from a close inspection of FIG. 1 that the line 2B-2B is taken slightly off-center to reveal the passageway 370 as illustrated in FIGS. 3D and 3G. This is necessary because the first and second passageways 370, 371, respectively, are separated by a post or solid portion 373. In regard to third and fourth passageways 122, 123, respectively, they are separated by a post or solid portion 382. See FIG. 3E. Further, in regard to fifth and sixth passageways 322, 321, respectively, they are separated by a post or solid portion 383. See FIG. 3C.

Output shaft carrier 150 includes a body portion 307 which includes and interior and an exterior. The exterior of the body section is generally cylindrically shaped with a slight taper as viewed from top to bottom. See, for example, FIG. 3B. The interior of the body 307 includes a series of interior diametrically stepped shoulders 301, 302, 303 and 304. See, FIGS. 3A and 3B. Shoulder 303 is the upper bearing shoulder 303 which traps the upper bearing 132 in combination with lock nut 185. Shoulder 301 receives lip seal 112 which secures the water slinger (cap 114) in place. Lip seal 112 and O-ring 112A prevent the escape of fluid from housing 101. Shoulders 302 and 304 do not support any structure however they bound areas and, hence, volumes where lubricant resides. Shoulder 304 in essence divides the body 307 into two portions, namely, the first portion where lubricant flows generally upwardly from shoulder 304 as it enters through the first and second passageways 370, 371 interconnecting first trough 125/125A with the upper bearing 132 as indicated by flow arrows 225C, 370A (FIG. 3D) and the second lower portion where lubricant flows through the fifth and sixth passageways 322, 321 interconnecting the second trough 121/121A with the lower bearing 131 as indicated by flow arrows 225F, 324 (FIG. 3C).

Bearing 131, like bearing 132 pumps lubricating fluid therethrough. Reference is made to FIG. 2B where lubricating fluid is fed to bearing 131 as indicated by flow arrow 225E where it is pumped through bearing 131 as indicated by reference numeral 225F and into a rotating pool 105P. Rotating pool 105P is formed by dike 105D which is a thin metal cylinder press-fit into an annular groove 105E in the upper portion of the gear. Lower bearing 131 is trapped by interior shoulder 306 on the output shaft carrier 150 and the land 260 on gear 105C. As the level of the lubricant increases in the pool it overflows dike 105D as indicated by flow arrow 225G where it is flung to the sidewall 240 of the housing Referring to FIG. 2B, flow arrow 225S indicates lubricant and lubricant flow around shaft 103. An annular volume of lubricant resides adjacent shaft 103 as illustrated in FIGS. 2, 2A and 2B. Shoulder 304 extends to shaft passageway 305 and lubricant resides on and above shoulder 304. A small amount of lubricant passes through the gap 261 between the shaft 103 and the passageway 305 into the portion of the body beneath shoulder 304. The lower bearing 131 is supported land 260 of gear 105C as is illustrated in FIG. 2B. Gear 105C is affixed to shaft 103 and is driven by input gear 140.

Trough 125 is filled with lubricating fluid as a result of the rotation of oil slinger 141 picking up oil (lubricating fluid) from reservoir 290 and expelling it radially upwardly where it engages and splashes from surface 151 of output shaft carrier 150 and is caught and collected in volume 125A of the trough. Flow arrow 225B represents the transport of the lubricant fluid into trough volume 125A whether it occurs as drippage from surface 151 on the underside surface of output shaft carrier 150 or whether the fluid accumulates in trough 125A on the fly directly from the oil slinger 141.

Figure 3:
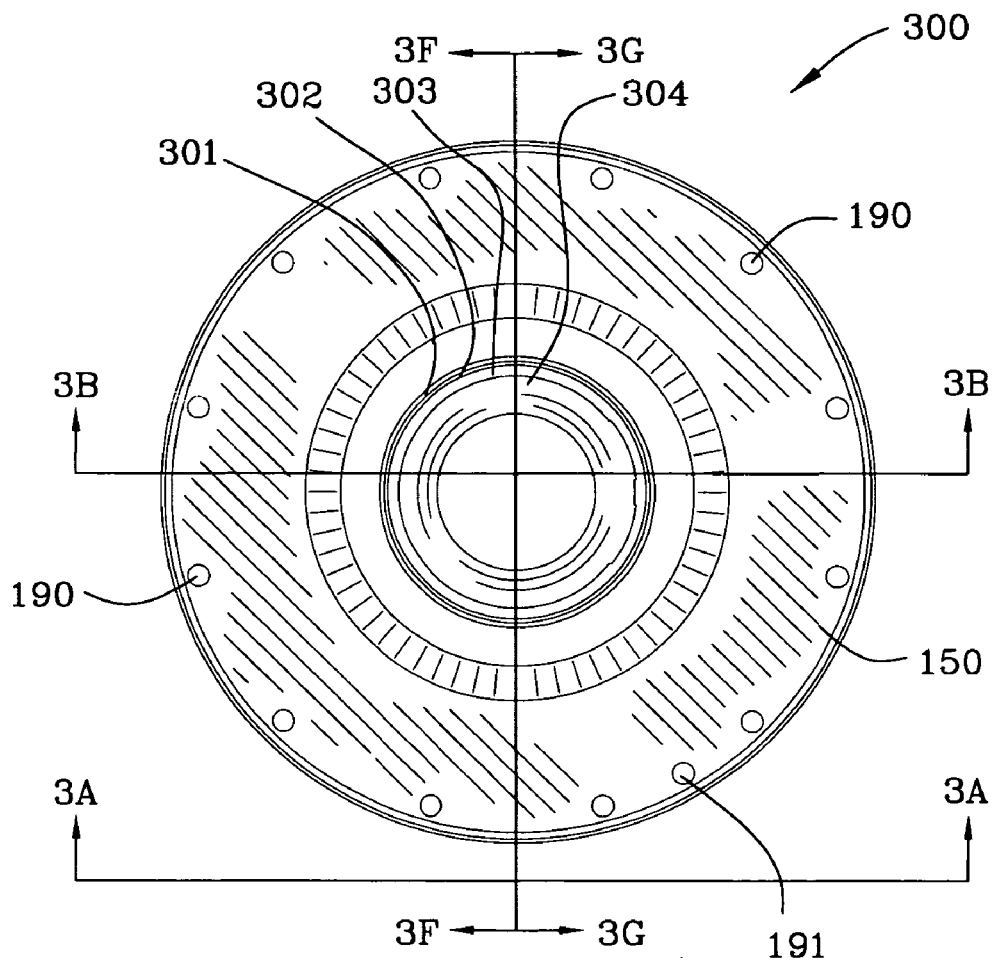
FIG. 3 is a top view of the output shaft carrier.
Figure 3A:
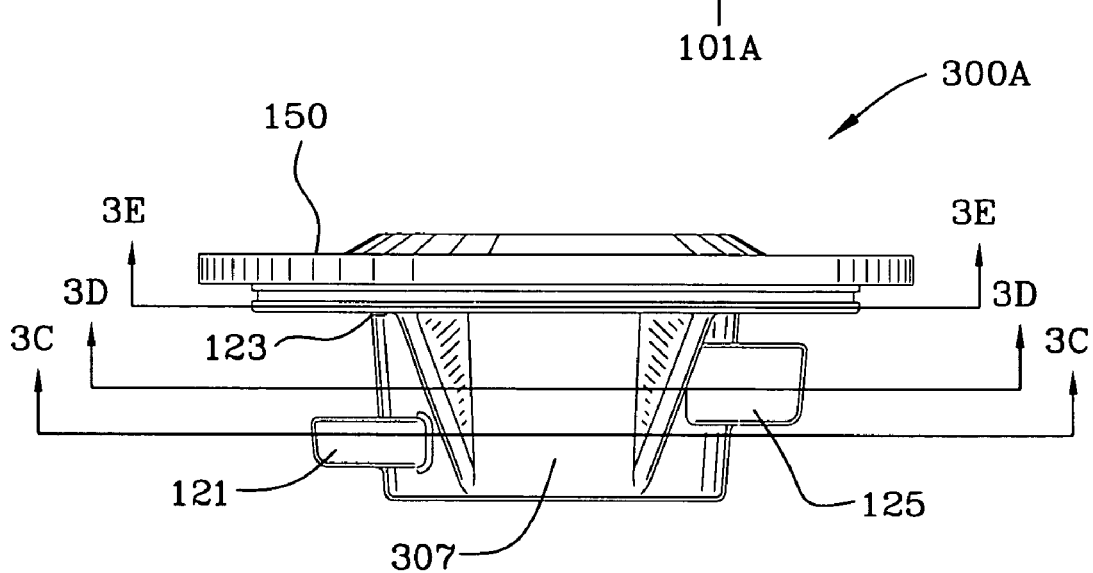
FIG. 3A is a front view of the output shaft carrier.
Figure 3B:
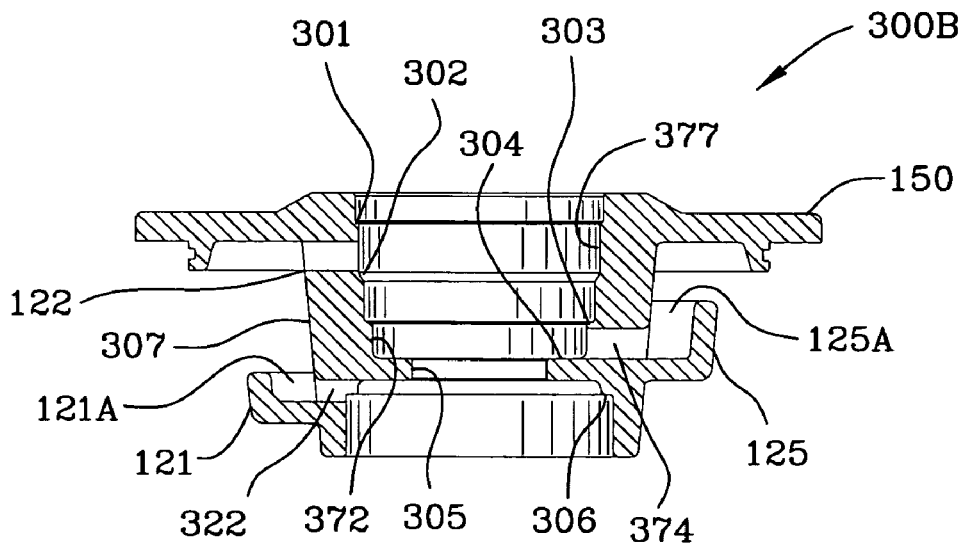
FIG. 3B is a cross-sectional view of the output shaft carrier taken along the lines 3B-3B of FIG. 3.
Figure 3C:
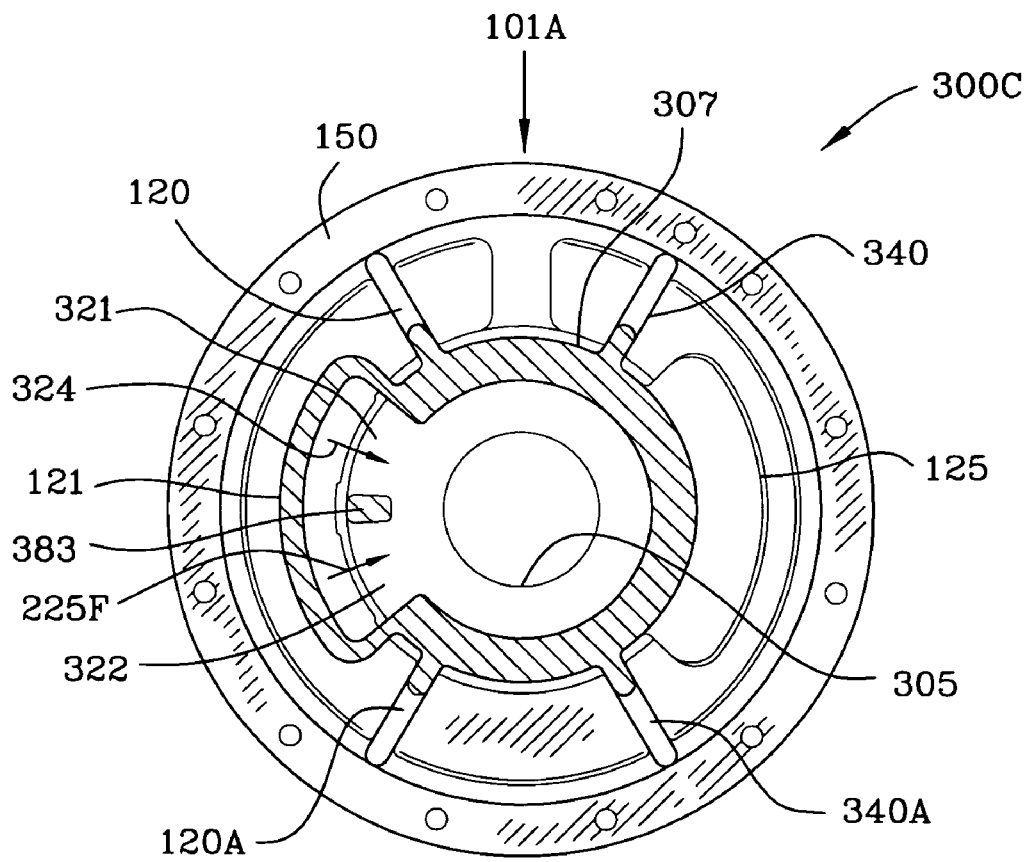
FIG. 3C is a cross-sectional view of the output shaft carrier taken along the lines of 3C-3C of FIG. 3B.
Figure 3D:
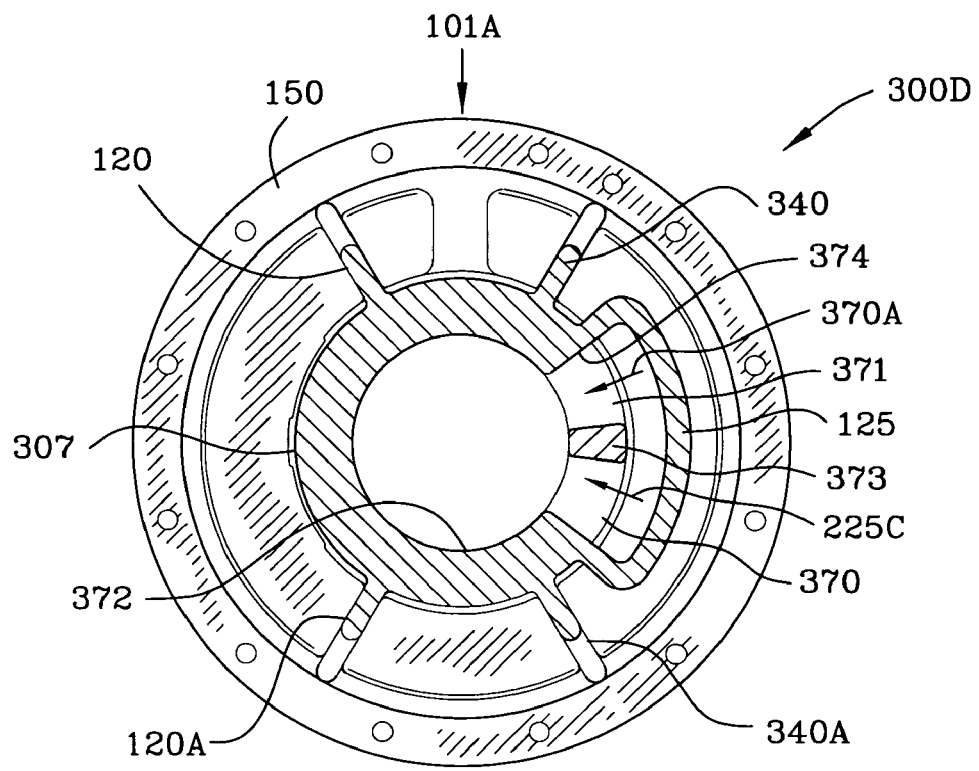
FIG. 3D is a cross-sectional view of the output shaft carrier taken along the lines of 3D-3D of FIG. 3B.

FIG. 3 is a top view 300 of the output shaft carrier 150 and the reference numeral 101A indicates the front side of the output shaft carrier 150. FIG. 3A is a front view 300A of the output shaft carrier 150. FIG. 3B is a cross-sectional view 300B of the output shaft carrier taken along the lines 3B-3B of FIG. 3. It will be noticed that the line 3B-3B is off center as is the line 2B-2B so as to illustrate the communication of trough 125/125A with the interior of the output shaft carrier and the communication (via passageway 122) of the interior and exterior of the output shaft carrier. Also, this view along the lines 3B-3B illustrates the communication (via passageway 322) of trough 121/121A with the interior of the output shaft carrier. FIG. 3C is a cross-sectional view 300C of the output shaft carrier taken along the lines of 3C-3C of FIG. 3A through second trough 121.

FIG. 3D is a cross-sectional view 300D of the output shaft carrier 150 taken along the lines of 3D-3D of FIG. 3A so as to illustrate passageways 370, 371 through body 307 enabling communication between first trough 125/125A and the interior of the output shaft carrier 150. FIG. 3G is a cross-sectional view 300G taken along the lines 3G-3G of FIG. 3. In viewing FIGS. 3D and 3G, reference numeral 101A indicates the front of the device as defined in FIG. 1 so as to orient the views.

Referring again to FIG. 2B, lines 2B-2B indicate a view which is cut off-center so as to view first passageway 370 and flow arrow 225C indicating the flow and direction of lubricating fluid into the upper bearing 132. Reference numeral 374 is used to denote one horizontal wall of the first passageway 370 as illustrated in FIG. 3B. Bearing 132 is of the type which performs a pumping action as shaft 103 rotates and the inner race and cylindrical bearings rotate with the shaft and with respect to the shaft. Second passageway 371 is viewed in FIG. 3D and flow arrow 370A indicates the direction of lubricating fluid flow through the body 307 of the output shaft carrier. The two passageways 370, 371 through body 307 of the output shaft carrier are separated by wall or solid portion 373. While two passageways are being used to communicate lubricating fluid to the interior of the output shaft carrier it is envisioned that one passageway or more than two passageways may be used alternatively.

Still referring to FIG. 2B, lubricating fluid 201 is pumped up above the upper bearing 132 into third passageway 122 with flow through the third passageway 122 indicated by flow arrow 225D. Arrow 225D also schematically illustrates flow out of passageway 122 where it falls under the force of gravity to trough 121/121A. A volume of fluid 201 resides beneath the upper bearing during operation of the gear reducer. The volume is bounded generally by an interior wall portion 372 which is in the general form of a cylinder and the shaft 103. See FIGS. 3B, 3F and 3G in regard to the interior wall portion 372.

Figure 3E:
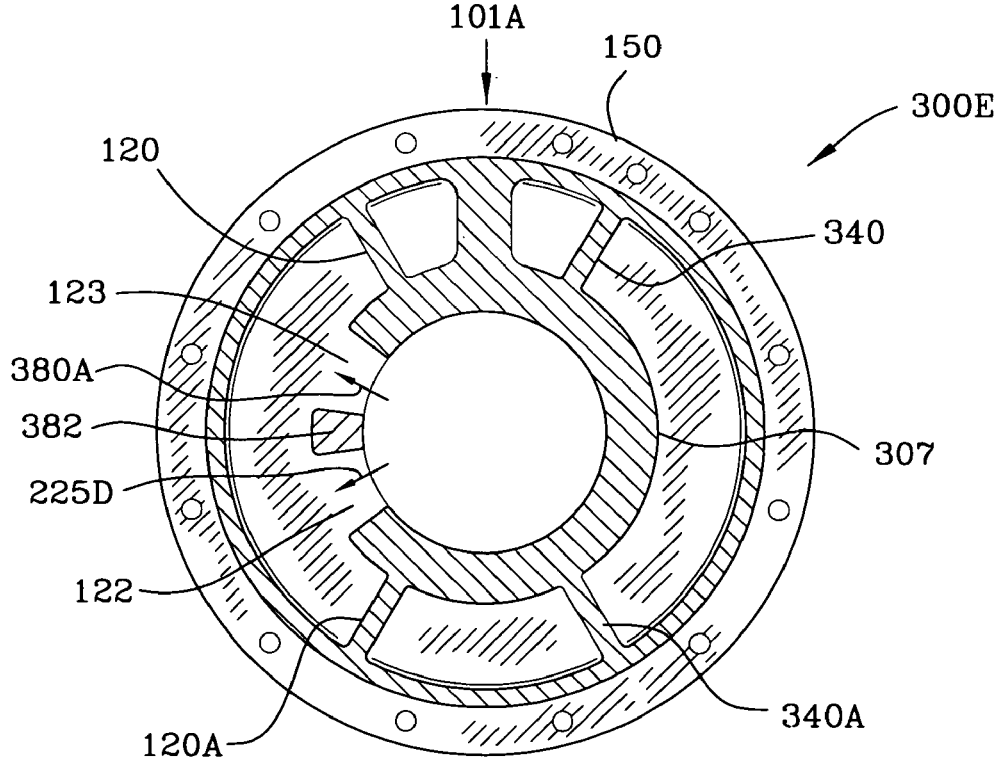
FIG. 3E is a cross-sectional view of the output shaft carrier taken along the lines of 3E-3E of FIG. 3B.
Figure 3F:
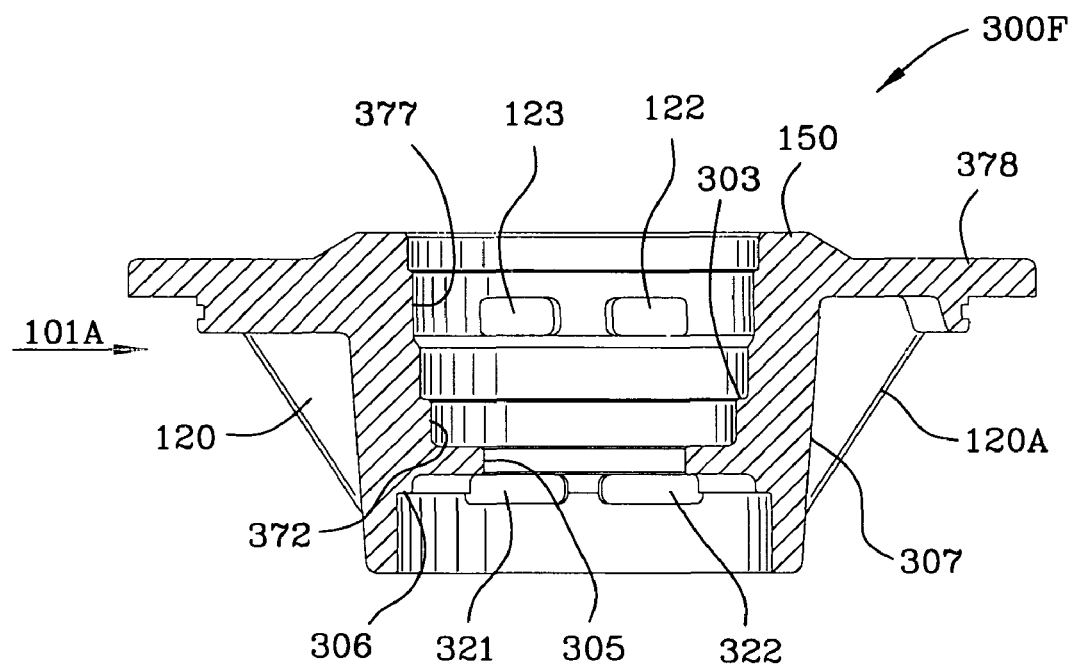
FIG. 3F is a cross-sectional view taken along the lines 3F-3F of FIG. 3.
Figure 3G:
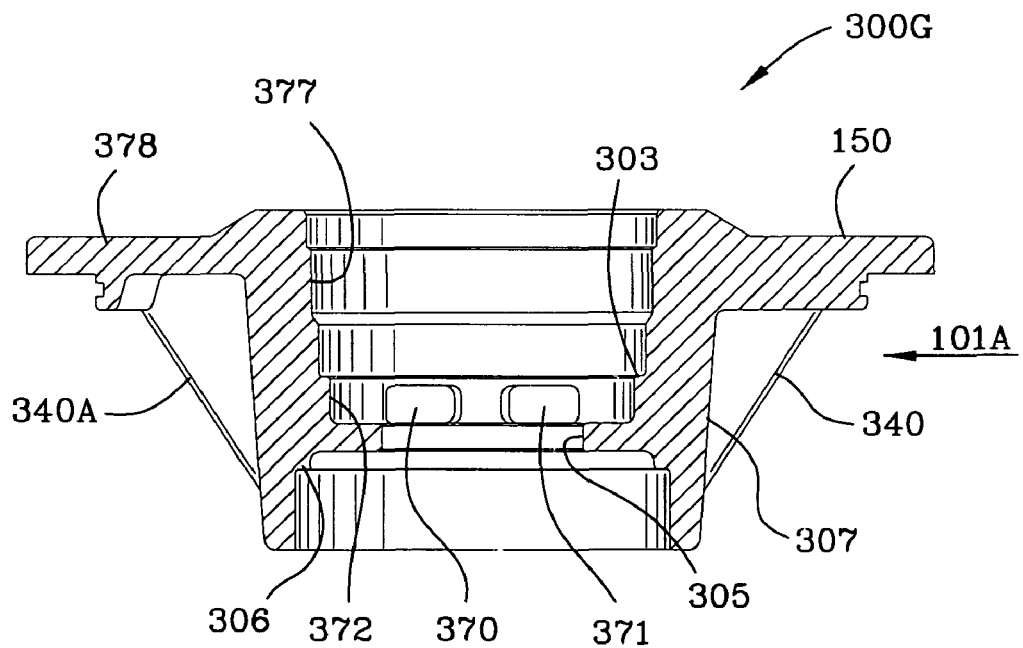
FIG. 3G is a cross-sectional view taken along the lines 3G-3G of FIG. 3.

Third passageway 122 is viewed best when reference is made to FIGS. 1B, 2B, 3E and 3F. FIG. 1B illustrates a small portion of the third passageway 122 as it is obscured by lip 124. Lip 24 as can be seen from FIGS. 2, 2A and 2B fits into housing 101 and an unnumbered O-ring seal resides in a groove of the lip and prevents escape of lubrication fluid. Reference numeral 240 designates the interior walls of the generally cylindrically shaped housing 101. Fourth passageway 123 is best illustrated in FIGS. 3E and 3F and serves the same function as third passageway 122, namely, the transport of lubricating fluid from above the upper bearing 132 and the interior of the body 377 to the exterior of the body emanating from the opening of the passageway where it may fall or flow under the influence of gravity to second trough 121 where it collects in volume 121A as indicated by flow arrow 225E.

FIG. 3E is a cross-sectional view 300E of the output shaft carrier 150 taken along the lines of 3E-3E of FIG. 3A so as to illustrate passageways 122, 123 through the body 307 enabling communication between the interior and exterior of the output shaft carrier 150. Reference numeral 101A is used in FIG. 3E to orient the front side of the output shaft carrier. This is beneficial in understanding the orientation of the views of FIGS. 3C-3G. Third and fourth passageways 122, 123 can best be viewed in FIG. 3F which is a cross-sectional view 300F of the output shaft carrier 150 taken along the lines 3F-3F of FIG. 3.

Upper bearing 132 is trapped against the upper bearing shoulder 303 as viewed in FIGS. 3F, 3G. Lock nut 185, as previously described is threaded to the shaft 103 and secures bearing 132 in place. See FIG. 2B.

Referring again to FIG. 2B, lubricating fluid 201 flows as indicated by flow arrow 225D out of passageway 122 and is drawn by gravity and falls to second trough 121. Output shaft carrier 150 is stationary as it is fixed to the housing 101. Oil is then fed by the second trough through the fifth 322 and sixth 321 passageways to the lower bearing 131 where it is then pumped downwardly into pool 105P. As gear 105C rotates the oil is expelled radially outwardly over dike 105D where it is directed to gear teeth 105C, oil slinger 141 and oil reservoir 290.

Recapitulating, oil slinger 141 rotates and picks up oil from reservoir 290 whereby it is slung radially toward the flange portion 378 of the output shaft carrier 150. Inner surface 151 of the flange portion 378 of the output shaft carrier 150 accumulates oil which drips into first trough 125/125A. Also oil is slung directly from the oil slinger 141 into the first trough 125/125A. Oil is collected in trough 125/125A and passes through passageways 370, 371 in the body 307 of the carrier where it is fed to and pumped by upper bearing 132 to third 122 and fourth 123 passageways where it is expelled therefrom. Under the force of gravity the oil 201 drops vertically to a second trough 121/121A where it is again fed back into the interior of the carrier through passageways 322, 321 to lower bearing 131. Lower bearing 131 pumps the lubricant to the pool 105P formed on the upper surface 105A of the gear where it is expelled therefrom under force by the rotation of the gear.

Upon shutdown of the gear reducer some oil remains in the first and second bearings due to the pooling of the oil in the first and second troughs as well as in the pool formed on the gear. Additionally, upon start-up of the gear reducer oil is stored in the pool 105P atop gear 105C such that it is immediately thrust radially therefrom for engagement with the oil slinger. Also during operation some of the oil from the pool will be slung upwardly and will be returned to the first trough.

A process for lubricating an output shaft with the output shaft 103 being carried partially within an output shaft carrier 150 is disclosed and claimed. The output shaft carrier 150 has a body, an interior and an exterior. The process includes the steps of: slinging lubricant into a first trough of the output shaft carrier; supplying lubricant from the first trough of the output shaft carrier through a first passageway in the body of the output shaft carrier to the interior of said body lubricating said shaft; pumping lubricant through an upper bearing to and through a second passageway; spilling lubricant from the second passageway; catching lubricant in a second trough; pumping lubricant through a lower bearing to a pool; and, overflowing the pool to lubricate the gear and to return lubricant to the reservoir.

Those skilled in the art will realize that the invention has been set forth by way of example only and that many changes may be made to the invention without departing from the spirit and scope of the appended claims.

The invention claimed is:

1. A bearing lubrication device comprising: a gear housing having an interior portion and a lubricating fluid reservoir therein; an output shaft; a stationary output shaft carrier housed within said gear housing; an upper bearing residing between said output shaft and said stationary output shaft carrier, said upper bearing supporting said output shaft; said output shaft resides partially within said stationary output shaft carrier; said stationary output shaft carrier includes a first trough for catching lubricating fluid; said first trough being in lubricating fluid communication with said upper bearing; said upper bearing pumping said lubricating fluid through said upper bearing and into an upper passageway; said upper passageway terminating in an opening from which said lubricating fluid emanates; said stationary output shaft carrier includes a second trough in fluid communication with said opening of said upper passageway.

2. A bearing lubrication device as claimed in claim 1 wherein a lower bearing residing between said output shaft and said stationary output shaft carrier is in communication with said second trough.

3. A bearing lubrication device as claimed in claim 2 wherein said lower bearing pumps said lubricating fluid therethrough.

4. A bearing lubrication device as claimed in claim 3 wherein said output shaft includes a gear affixed thereto; said gear includes a flat upper portion having a cylindrically shaped dike secured therein forming an annular pool of lubricating fluid; and, said lower bearing supplying lubricating fluid to said annular pool.

5. A bearing lubrication device as claimed in claim 4 wherein said gear includes teeth and said lubricating fluid overflows said annular pool formed on said gear providing lubricating fluid to said gear teeth and said lubricating fluid reservoir.

6. A bearing lubrication device as claimed in claim 1 wherein a lubricant slinger slings lubricant to said at least one trough.

7. A bearing lubrication device as claimed in claim 1 wherein said stationary output shaft carrier includes a body portion and said body portion is generally cylindrically shaped.

8. A bearing lubrication device as claimed in claim 7 wherein said generally cylindrically shaped body portion is slightly tapered.

9. A bearing lubrication device as claimed in claim 7 wherein said at least one trough extends arcuately along and from said body portion of said stationary output carrier shaft.

10. A bearing lubrication device as claimed in claim 7 wherein said second trough extends arcuately along and from said body portion of said stationary output shaft carrier.

11. A bearing lubrication device comprising: a gear housing having an interior portion; a lubricating fluid reservoir within said gear housing; a stationary output shaft carrier housed within said gear housing; an upper bearing for supporting said output shaft; said upper bearing resides between said output shaft and said stationary output shaft carrier; said output shaft resides partially within said stationary output shaft carrier; said stationary output shaft carrier includes a first trough for catching lubricating fluid; said first trough being in lubricating fluid communication with said upper bearing; said upper bearing pumping said lubricating fluid through said upper bearing and into an upper passageway; said upper passageway terminating in an opening from which said lubricating fluid emanates; said stationary output shaft carrier includes a second trough in fluid communication with said opening of said upper passageway; a lower bearing for supporting said output shaft, said lower bearing resides between said output shaft and said stationary output shaft carrier; said lower bearing in lubricating fluid communication with said second trough; said output shaft includes a gear affixed thereto; said gear includes a flat upper portion having a cylindrically shaped dike secured therein forming an annular pool; and, said lower bearing supplying lubricating fluid to said annular pool.

12. A bearing lubrication device as claimed in claim 11 wherein said gear includes teeth and said lubricating fluid overflows said annular pool to said gear and to said lubricating fluid reservoir.

13. A bearing lubrication system as claimed in claim 12 wherein an oil slinger supplies oil to said first trough.

14. A bearing lubrication device as claimed in claim 11 wherein said stationary output shaft carrier includes a body portion and said body portion is generally cylindrically shaped.

15. A bearing lubrication device as claimed in claim 14 wherein said generally cylindrically shaped body portion is slightly tapered.

16. A bearing lubrication device as claimed in claim 15 wherein said at least one trough extends arcuately from said body portion of said stationary output shaft carrier.

17. A bearing lubrication system as claimed in claim 16 wherein said second trough extends arcuately from said body portion of said stationary output shaft carrier.

18. An output shaft lubrication device comprising: a stationary output shaft carrier; said stationary output shaft carrier includes a body portion having an interior and an exterior; a first arcuately shaped trough and a second arcuately shaped trough residing on said exterior of said body portion of said stationary output shaft carrier; first and second passageways in said body portion interconnecting said first trough with said interior of said stationary output shaft carrier; third and fourth passageways in said body portion interconnecting said interior portion of said stationary output shaft carrier with said exterior of stationary said output shaft carrier; and, fifth and sixth passageways in said body portion interconnecting said second trough with said interior of said stationary output shaft carrier.

19. An output shaft lubrication device as claimed in claim 18 further comprising an output shaft and a gear affixed to said output shaft; said gear includes a substantially flat upper portion having an annular dike secured therein; and, said interior portion of said stationary output shaft carrier communicating with said substantially flat upper portion of said gear bounded by said annular dike.

20. An output shaft lubrication device as claimed in claim 19 further comprising upper and lower shaft bearings; said lower bearing engaging said gear and a first interior shoulder of said body of said stationary output shaft carrier; and, said upper bearing engaging a second interior shoulder and a bearing nut.

21. An output shaft lubrication device as claimed in claim 20 further comprises: a housing having a lubricant reservoir with lubricant therein: a lubricant slinger; and, wherein said stationary output shaft carrier resides in said housing and wherein said lubricant slinger provides oil directly or indirectly to said first trough.

22. An output shaft lubrication device as claimed in claim 21 wherein said first and second passageways provide lubricant from said first trough to said shaft and to said upper bearing which pumps lubricant to said third and fourth passageways and then to said second trough where said lubricant is fed to and pumped by said lower bearings to said substantially flat upper portion of said gear bounded by said dike.

23. An output shaft lubrication device as claimed in claim 22 wherein said lubricant pools on said substantially flat upper portion of said gear bounded by said dike and overflows therefrom lubricating said gear and providing lubricant to said lubricant slinger and said reservoir.

24. An output shaft lubrication device as claimed in claim 21 wherein said stationary output shaft carrier includes an upper portion and said upper portion is secured to and aligned with said housing.

25. A process for lubricating an output shaft, said output shaft being carried partially within a stationary output shaft carrier, said stationary output shaft carrier having a body, an interior and an exterior, comprising the steps of:
   slinging lubricant from a reservoir into a first stationary trough of said stationary output shaft carrier;
   supplying lubricant from said first stationary trough of said stationary output shaft carrier through a first passageway in said body of said stationary output shaft carrier to said interior of said body lubricating said shaft;
   pumping lubricant through an upper bearing to and through another passageway;
   spilling lubricant from said another passageway;
   catching lubricant in a second stationary trough; and,
   pumping lubricant through a lower bearing to a pool.

26. A process for lubricating an output shaft as claimed in claim 25 further comprising the steps of:
   overflowing said pool to lubricate said gear and to return lubricant to said reservoir.

27. A bearing lubrication device for lubricating bearings which support a shaft, comprising: a stationary output shaft carrier, said stationary output shaft carrier encasing a first bearing interposed between said stationary output shaft carrier and said shaft, said stationary output shaft carrier includes a first trough catching and communicating lubricant through said stationary output shaft carrier to said first bearing; wherein said stationary output shaft carrier encases a second bearing interposed between said carrier and said shaft and said stationary output shaft carrier includes a second trough catching and communicating lubricant through said stationary output shaft carrier to said second bearing; said first trough is arcuately shaped and extends radially from said stationary output shaft carrier; and wherein said second trough is arcuately shaped and extends radially from said stationary output shaft carrier.

28. A bearing lubrication device for lubricating bearings which support a shaft as claimed in claim 27 wherein: said shaft is affixed to a gear, said gear includes an upper portion, a dike affixed to said upper portion of said gear forming a pool, and, said lubricant being fed to said pool.

29. A bearing lubrication device for lubricating bearings as claimed in claim 27 wherein said lubricant is pumped to said first trough.

* * * * *